United States Patent
Hui (10) Patent No.: US 10,200,283 B2
(45) Date of Patent: Feb. 5, 2019

(54) AUTOMATIC REROUTING IN THREAD NETWORKS

(71) Applicant: Google Inc., Mountain View, CA (US)

(72) Inventor: Jonathan Wing-Yan Hui, Belmont, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 15/645,496

(22) Filed: Jul. 10, 2017

(65) Prior Publication Data

US 2019/0014043 A1 Jan. 10, 2019

(51) Int. Cl.
*H04L 12/741* (2013.01)
*H04L 12/823* (2013.01)
*H04L 12/801* (2013.01)
*H04L 12/851* (2013.01)
*H04W 84/18* (2009.01)

(52) U.S. Cl.
CPC .............. *H04L 45/74* (2013.01); *H04L 47/24* (2013.01); *H04L 47/29* (2013.01); *H04L 47/32* (2013.01); *H04W 84/18* (2013.01)

(58) Field of Classification Search
CPC ......... H04L 45/74; H04L 47/24; H04L 47/29; H04L 47/32; H04W 84/18
See application file for complete search history.

(56) References Cited

U.S. PATENT DOCUMENTS

2014/0269702 A1* 9/2014 Moreno .................. H04L 45/64
370/390
2016/0065531 A1* 3/2016 Xiaopu ................. H04L 61/103
709/238

\* cited by examiner

*Primary Examiner* — Duc C Ho
(74) *Attorney, Agent, or Firm* — Colby Nipper (57) ABSTRACT

In aspects of automatic rerouting in Thread networks, a router device in a mesh network receives a packet to forward to a destination node, and the packet includes a Routing Locator (RLOC) for the destination node. The router device can determine that the packet cannot be forwarded using the RLOC. The router device can then initiate an address query over the mesh network, where the address query includes an Endpoint Identifier (EID) of the destination node. The router device can receive an EID-to-RLOC mapping for the EID from a node device in the mesh network, and forward the packet to the destination node using the received EID-to-RLOC mapping.

20 Claims, 8 Drawing Sheets

AUTOMATIC REROUTING IN THREAD NETWORKS

BACKGROUND

Using wireless mesh networking to connect devices to each other, and to cloud-based services, is increasingly popular for sensing environmental conditions, controlling equipment, and providing information and alerts to users. Many devices on mesh networks are designed to operate for extended periods of time on battery-power, which limits the available computing, user interface, and radio resources in the devices. Additionally, some mesh network devices may sleep periodically to reduce power consumption and are not in constant radio contact with the mesh network to receive data packets. Due to variability in radio environments of mesh networks, the topology of mesh networks varies over time and affects packet routing in the mesh network. However, with the increasing ubiquity and interconnectedness of mesh networks, network addressing techniques limit the efficiency, flexibility, and redundancy of routing data packets within mesh networks and between mesh network devices and external network devices and services. A packet from an application at a cloud-based service may traverse multiple networks using different networking technologies, some with bandwidth and latency constraints, to reach a destination mesh network node. When a packet is undeliverable, as addressed, the delays of reacquiring a new route for, and retransmitting of, the packet reduce application reliability and responsiveness.

SUMMARY

This summary is provided to introduce simplified concepts of automatic rerouting in Thread networks, generally related to addressing and routing. The simplified concepts are further described below in the Detailed Description. This summary is not intended to identify essential features of the claimed subject matter, nor is it intended for use in determining the scope of the claimed subject matter.

Automatic rerouting in Thread networks, generally related to methods, devices and systems for addressing and routing packets in a mesh network, is described. In aspects, a router device in the mesh network receives a packet to forward to a destination node, the packet including a Routing Locator (RLOC) for the destination node. The router device can determine that the packet cannot be forwarded using the RLOC and sends an address query, which includes an Endpoint Identifier (EID) for the destination node, over the mesh network. The router device receives an EID-to-RLOC mapping for the EID from another router, and then forwards the packet to the destination node using the received EID-to-RLOC mapping.

BRIEF DESCRIPTION OF THE DRAWINGS

Aspects of automatic rerouting in Thread networks are described with reference to the following drawings. The same numbers are used throughout the drawings to reference like features and components.

DETAILED DESCRIPTION

Wireless mesh networks are communication networks having wireless nodes connected in a mesh topology that provides reliable and redundant communication paths for data traffic within the mesh network. Wireless mesh networks use multiple radio links, or hops, to forward data traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks. Similarly other wireless mesh network technologies, such as Bluetooth®, Thread®, ZigBee®, Z-Wave®, Bluetooth® Low Energy (BLE), Bluetooth Smart, and Bluetooth Mesh have similar layered networking stacks.

Each of the various devices in a mesh network will experience different radio frequency (RF) environmental characteristics based on the location of the device, other devices located around the device, and/or characteristics of the deployment environment. Some of the RF characteristics that affect the RF environment may be relatively static, such as the attenuation of RF signals by walls in a building structure. Other RF characteristics may vary over time due to the intermittent operation of radio devices in and around the structure, fast or slow fading of RF signals, the addition, and/or relocation of mesh network or other radio devices within the deployment environment, and other sources of RF energy. These RF environmental changes, as well as device failures and/or device relocation by a user can affect the routing paths for packets in the mesh network.

Applications at a cloud-based service transmit packets to, and receive packets from, mesh network devices. These packets traverse a number of networks that use varying technologies. To facilitate low power operation, the mesh network uses low-power radio techniques that may use low data rates to conserve energy. Further, the network connection from a mesh network to the cloud-based service may include cellular wireless systems with bandwidth and cost constraints for transmitting data.

Many devices for mesh networks, such as sensors, are designed for low-power, battery operation over long periods of time, such as months or years. To achieve long service life, a battery-powered mesh device may turn off, or sleep, many of the device functions, such as radio and network interfaces, for periods of time. During sleep periods, the mesh device is not available on the mesh network to receive packets addressed to it. These sleeping mesh devices connect to a parent device that is capable of responding on behalf of the sleeping mesh device when it is not awake and active on the mesh network. The parent device buffers packets destined for the child device and responds, on behalf of the child device.

The various RF characteristics and effects individually or in combination may lead to a router device in the mesh network receiving a packet from a source node, such as from the cloud-based service, and the router is unable to deliver the packet to the destination node at the destination address in the packet header. This may be caused by devices in the mesh network changing their connectivity, such as a sleeping child device choosing a new parent device, a destination node being unreachable because of changes in the RF environment, and so forth. If the router device is unable to forward the packet, it may drop the packet and send a message to the source node indicating the communication failed.

The router device may determine that the routing locator (RLOC) for the destination is no longer valid if forwarding the packet using the RLOC fails. The router device may also be a parent device and determine that the mesh network device associated with the destination RLOC is no longer a child of the parent router. In either of these cases, the router device lacks a valid route for delivery of the packet and will drop the packet.

In aspects of automatic rerouting in Thread networks, the router device determines that the RLOC cannot be used to successfully forward the packet and performs an address query using the IPv6 destination address for the packet. In response to the address query, the router device receives an IPv6-to-RLOC address mapping. The router device then forwards the packet using the updated address mapping. The router can also cache the updated address mapping to forward any further packets that the router device receives. Additionally, the router device can notify the source node of the updated address mapping using an address notification message to mitigate further transmissions of packets using the invalid RLOC.

In aspects of automatic rerouting in Thread networks, the packet received at the router device may include a marking, such as particular bits set in fields of the packet, which indicate a priority level, a class of the packet, and so forth. The router device determines from the marking if a packet with an invalid address mapping should be dropped or if the router should perform the address query to update the address mapping. For example, a marking that indicates an alarm condition triggers the router device to perform the address query and reroute the packet, or the marking indicates a level of priority and the router determines if the priority is above a threshold that triggers performing the address query and rerouting the packet.

In other aspects of automatic rerouting in Thread networks, the router device may receive additional packets with the same invalid IPv6-to-RLOC address mapping after the router has sent the address query, but has not yet received the updated address mapping. The router device buffers the additional packets, and if an updated address mapping is received, the router updates the RLOC in the additional packets and forwards the packets to the destination node. After the updated address mapping is received, the router device can store the updated address mapping in an address mapping cache and use the cached address mapping to forward additional packets that are received by the router device.

In other aspects of automatic rerouting in Thread networks, multiple Thread networks may be connected to a backbone network by backbone routers. If the router device determines that the RLOC is invalid and does not receive an address update within the router's Thread network, the router device sends a message to the backbone router for the router's Thread network indicating the address query has failed. The backbone router then transmits an address query to other backbone routers across the backbone network, which in turn sends the address query across the other Thread networks to determine if an updated address mapping is available. If a router on another Thread network has an address mapping, that router responds with the updated address mapping, which is refreshed in the caches of the backbone routers, as well as the router that initially made the address query.

The rerouting of packets in aspects of automatic rerouting in Thread networks improves routing reliability and efficiency in Thread networks by reducing the number of packets that are dropped due to outdated IPv6-to-RLOC address mappings. The rerouting of packets also reduces latency for applications that communicate with devices in Thread networks to provide improved and more consistent responsiveness to users of the application.

While features and concepts of the described systems and methods for automatic rerouting in Thread networks can be implemented in any number of different environments, systems, devices, and/or various configurations, aspects of automatic rerouting in Thread networks are described in the context of the following example devices, systems, and configurations.

Figure 1:
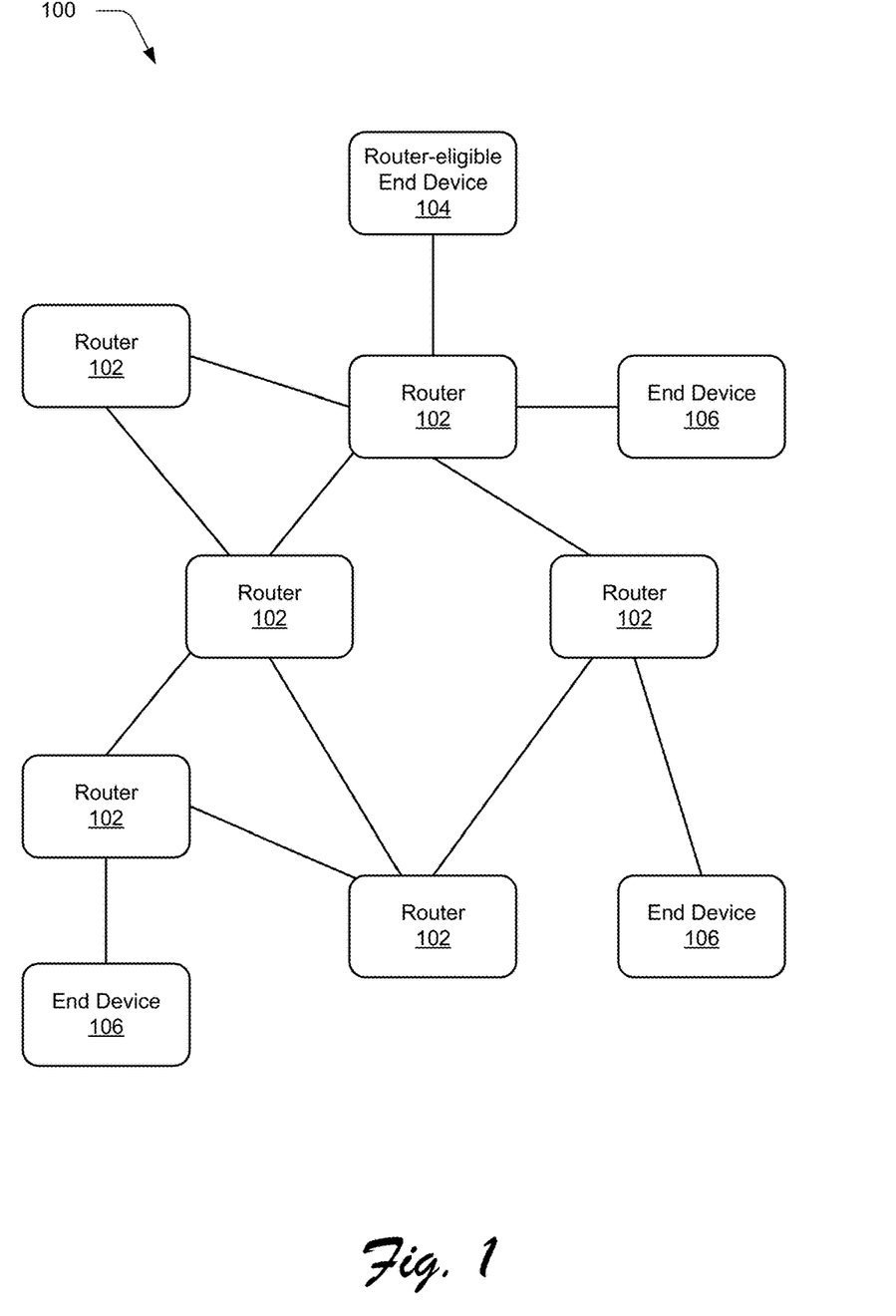
FIG. 1 illustrates an example mesh network system in which various aspects of automatic rerouting in Thread networks can be implemented.

FIG. 1 illustrates an example system as a mesh network 100 in which various aspects of automatic rerouting in Thread networks can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the respective mesh network interfaces. The routers 102 also route traffic across the mesh network 100.

The router-eligible end device 104 is representative of router-eligible end devices that are located at leaf nodes of the mesh network topology and are not actively routing traffic to other nodes in the mesh network 100. The router-eligible device 104 is capable of becoming a router 102 when the router-eligible device 104 is connected to additional mesh network devices. The end devices 106 are devices that can communicate using the mesh network 100, but lack the capability, beyond simply forwarding packets to its parent router 102, to route traffic in the mesh network 100. For example, a battery-powered sensor is one type of end device 106.

Some end devices 106 may power down (i.e., sleep) some operations or hardware for a portion of the time the end device 106 is operational. For example, the end device 106 may power down radios or network interfaces, to conserve power between operations that require a connection to the mesh network 100. For example, a battery-powered temperature sensor may only be awake periodically to transmit a report of temperature, and then the temperature sensor sleeps until the next time the temperature sensor reports. When the end devices 106 sleep, the end devices 106 are not actively connected to the mesh network 100 to respond to address queries or to receive data packets over the mesh network 100.

Figure 2:
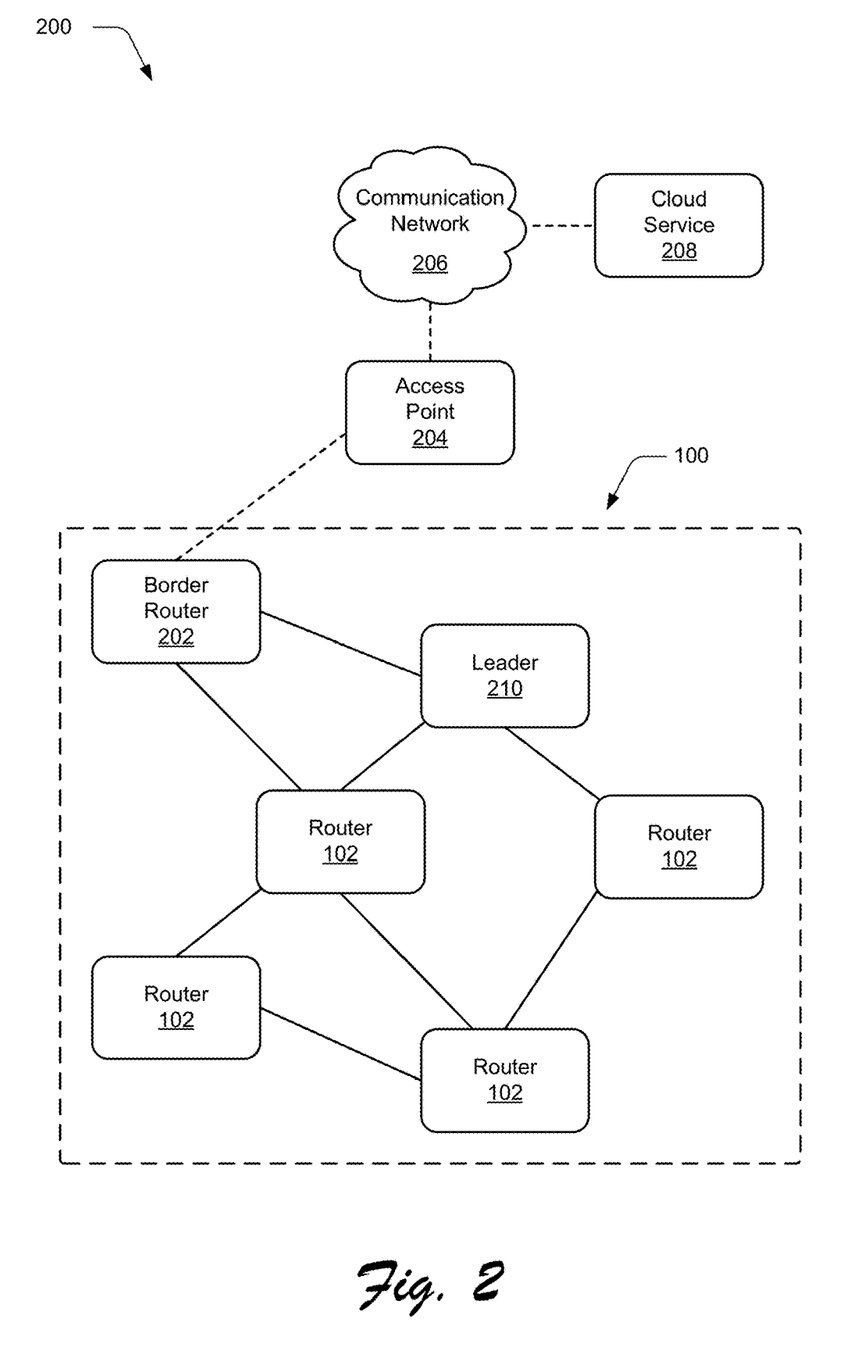
FIG. 2 illustrates an example environment in which various aspects of automatic rerouting in Thread networks can be implemented.

FIG. 2 illustrates an example environment 200 in which various aspects and techniques of automatic rerouting in Thread networks can be implemented. The environment 200 includes the mesh network 100, in which some routers 102 are performing specific roles in the mesh network 100.

A border router 202 (also known as a gateway and/or an edge router) is one of the routers 102. The border router 202 includes the mesh network interface, as well as a second interface for communication with an external network, outside the mesh network 100. The border router 202 connects to an access point 204 over the external network. For example, the access point 204 may be an Ethernet router, a Wi-Fi access point, a cellular base station, or any other suitable device for bridging different types of networks. Although a single border router 202 is shown in FIG. 2, for the sake of clarity, the mesh network 100 may have any number of border routers 202, which may connect to any number of external networks. In another implementation, an end device 106 may operate as a border router 202. In this case the end device operating as the border router 202 is routing traffic between the mesh network 100 and an external network, but not routing traffic between other mesh network devices.

The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

One of the routers 102 performs the role of a leader 210 for the mesh network 100. The leader 210 manages router identifier assignment, is the central arbiter of network configuration information, and propagates network data, which includes the network configuration information, for the mesh network 100.

Mesh Network Address Architecture

In the mesh network 100, a link-local scope may be defined by a set of mesh network interfaces (mesh network devices) that are reachable with a single radio transmission. In other words, the link-local scope includes the mesh network devices that connect directly to each other within the mesh network 100.

The mesh network devices use link-local addresses to reach the mesh network devices within range of the single radio transmission. The mesh network devices use the link-local addresses to discover neighbors, configure links, and/or exchange routing information. In certain aspects, the mesh network devices are assigned the link-local address with an interface identifier derived from an IEEE 802.15.4 Extended Address of the Media Access Control (MAC) layer of the IEEE 802.15.4 network stack. For example, a mesh network device assigns a link-local IPv6 address with an Interface Identifier (IID) that is obtained by computing a SHA-256 hash of the IEEE 802.15.4 Extended Address, and taking the first eight bytes of that SHA-256 hash as the IID. When attached to the mesh network 100, the mesh network device assigns the link-local IPv6 address the same IID as an RLOC assigned to the mesh network device. The addressing and routing of packets in the mesh network is described in U.S. patent application Ser. No. 14/798,448 entitled "Mesh Network Addressing" filed Jul. 13, 2015, the disclosure of which is incorporated by reference herein in its entirety.

In some aspects, all the mesh network devices in the mesh network 100 use a number of different unicast addresses for communication (e.g., IPv6 unicast addresses). For addresses that have a scope larger than the link-local scope, the mesh network 100 may define two different types of addresses: Routing Locators (RLOCs) and Endpoint Identifiers (EIDs).

The RLOC is a network address (e.g., IPv6 address) that identifies the location of a particular mesh network device within the mesh network 100. In some aspects, the RLOC is only used by the mesh network devices for communicating control traffic and delivering datagrams (e.g., IPv6 datagrams, UDP transmissions, and so forth) to their intended destinations. In such aspects, applications generally do not have visibility to or use RLOCs.

A unicast RLOC has the Mesh-Local scope and encodes the Router Identifier (Router ID) and the Child Identifier (Child ID) in an Interface Identifier (IID). As an example and not a limitation, the prefix for the unicast RLOC is the Mesh-Local prefix and the Interface Identifier, and has the form 0000:00FF:FE00:xxxx, where 'xxxx' is a 16-bit value that embeds the Router ID and the Child ID.

A mesh network Endpoint Identifier (EID) is a network address (e.g., an IPv6 address) that uniquely identifies a given mesh network device within the mesh network 100 and is independent from topology changes in the mesh network 100. Other than the RLOC, the mesh network 100 considers all other unicast addresses (such as IPv6 unicast addresses) that have the same or larger scope than the Mesh-Local scope as Endpoint Identifiers. The Endpoint Identifier is independent from the position of the mesh network device within the mesh network 100 and does not change in response to topology changes in the mesh network 100.

The EID provides a stable identifier for the mesh network device within the mesh network 100. However, the EID is not directly routable because the mesh routing protocol only exchanges route information for RLOCs. To deliver a datagram, such as an IPv6 datagram, with an EID as the IPv6 Destination Address, a mesh network device performs an EID-to-RLOC mapping lookup.

For example, the mesh network device receives a data packet with a Destination Address, which includes an IPv6 address prefix that indicates the address has an associated on-mesh RLOC. The mesh network device can determine that there is an associated on-mesh RLOC by comparing the received IPv6 address prefix to the address prefixes in the provisioning domains propagated within the mesh network 100.

If the mesh network device determines that the Destination Address is associated with an on-mesh address prefix, the mesh network device discovers an EID-to-RLOC mapping for the received address. The EID-to-RLOC mapping can be found by any suitable manner, such as searching in a cache of EID-to-RLOC mappings stored by the mesh network device, or multicasting an address query to all routers 102 and/or router-eligible end devices 104 in the mesh network 100.

In an aspect, the mesh network device includes an address query set that caches the EID-to-RLOC mappings. The address query set of EID-to-RLOC mappings includes EID-to RLOC mappings obtained from the address queries initiated by the mesh network device. The address query set may also include EID-to-RLOC mappings obtained opportunistically by observing mesh network traffic routed through the mesh network device, and storing the EID-to-RLOC mappings, from the observed traffic, in the address query set.

In an aspect, the mesh network device multicasts an address query message including the EID, for which the EID-to-RLOC mapping is sought, over the mesh network 100. The address query message is multicast to all the routers 102 and the router-eligible end devices 104. The address query message is multicast using a multicast address designating that the address query message is addressed to all the routers 102 and the router-eligible end devices 104 in the mesh network 100. Any router 102 and/or router-eligible end device 104 that has an EID-to-RLOC mapping, for the EID in the address query message, responds to the address query message by sending the associated EID-to-RLOC mapping to the mesh network device that initiated the address query.

Because the EIDs remain stable in the face of topology changes in the mesh network 100, the application programs are implemented to use the EIDs when communicating with the mesh network devices. However, in some aspects, various application programs may use RLOCs directly for simple request-response communication patterns within the mesh network 100.

End Device Addressing

Many types of the end devices 106, such as sensors, are designed for low-power, battery operation for long periods of time, such as months or years. To achieve long service life, a battery-powered mesh device may turn off, or sleep, many of the device operations such as radio and network interfaces for periods of time. The end devices 106 can communicate using the mesh network 100, but lack the capability, beyond simply forwarding to the parent router 102, to route traffic in the mesh network 100. As such, this type of device may referred to as a Reduced Function Device (RFD) or a sleepy child device. During sleep periods, the end device 106 is not available on the mesh network 100 to receive data packets addressed to the end device 106.

When the end device 106 attaches to the parent router 102, an address registration for the end device 106 assigns the Child ID to the end device 106. Using the assigned Child ID and the Router ID of the parent router 102, the parent router 102 responds, on behalf of the child end device 106, to mesh network traffic addressed to the child end device 106.

Routing of packet data in the mesh network 100 is based on RLOCs that are mapped to EIDs. For the child end device 106 that is attached to the parent router 102, the router ID of the parent router 102, and the Child ID of the child end device 106, are encoded into an Interface Identifier (IID). For example, the Router ID is encoded into a first subset of bit fields in the IID and the Child ID is encoded into a second subset of bit fields in the IID. By way of example and not limitation, the Router ID is encoded into bits 0-5 of a 16-bit IID and the Child ID is encoded into bits 7-15 of the IID. Any given router 102 may have multiple child end devices 106 registered at any given time.

The RLOC for each end device 106 is encoded with Mesh-Local scope from the encoded Router ID and Child ID in the IID. The RLOC for the end device 106 is used by the mesh network devices to address and route data packets to the end device 106. When a data packet is addressed using such an RLOC, the data packet is routed in the mesh network 100 to the parent router 102 of the child end device 106, which is important in the cases where the end device 106 sleeps for periods of time. In cases where the end device 106 does not sleep, the parent router 102 may respond with the RLOC for the child end device 106, which will allow packets to be sent directly to the child end device 106.

The parent router 102 responds to any message addressed to the child end device 106. For example, the parent router 102 responds to any address query, containing the EID of the child end device 106, with the RLOC for the child end device 106.

The child end device 106 operates as a host-only device and forwards all packets to the parent router 102 for communication across the mesh network 100 and/or to external networks. For example, the child end device 106 does not resolve an EID to an RLOC. The child end device 106 depends on the parent router 102 to perform the resolution. Rather, the child end device 106 depends on the parent router 102 to select the border router 202 for packets with a destination outside the mesh network 100.

The child end device 106 also depends on the parent router 102 to receive and store all data packets addressed to the child device 106, as well as multicast messages from multicast addresses that the child end device 106 registered with the parent router 102, and which may be received while the child end device 106 is sleeping. When the child end device 106 awakes, the stored data packets are forwarded to the child end device 106. The parent router 102 responding on behalf of the sleeping child end 106 device ensures that traffic for the child end device 106 is handled efficiently and reliably on the mesh network 100, as the parent router 102 responds to messages sent to the child end device 106, which enables the child end device to operate in a low-power mode for extended periods of time to conserve power.

Automatic Rerouting

Figure 3:
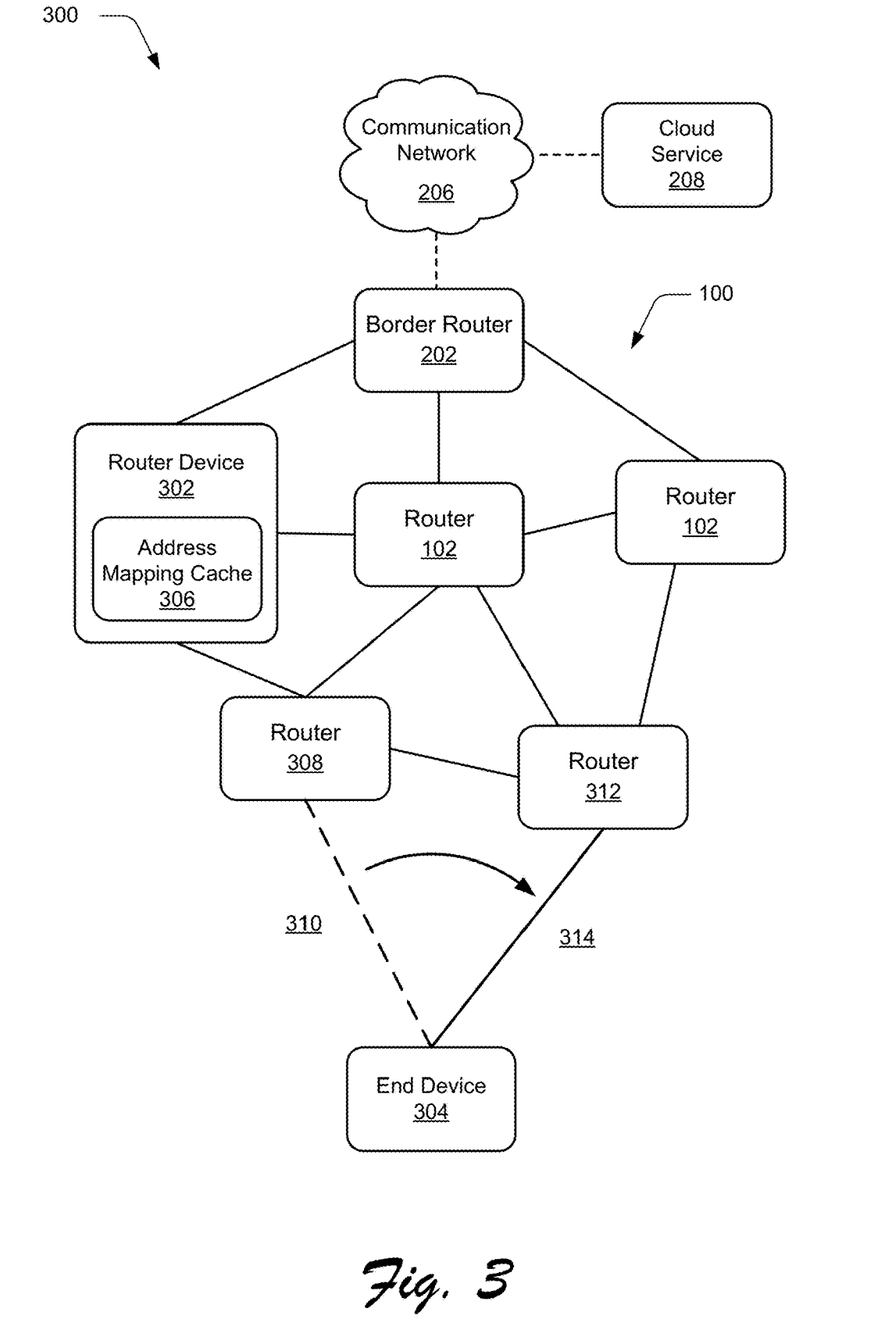
FIG. 3 illustrates another example environment in which various aspects of automatic rerouting in Thread networks techniques can be implemented.

FIG. 3 illustrates an example environment 300 in which various aspects of automatic rerouting in Thread networks techniques can be implemented. The environment 300 illustrates the mesh network 100 connected to the cloud service 208 via the communication network 206.

In an aspect of automatic rerouting in Thread networks, a router device 302 receives a packet, such as from an application at the cloud service 208, for a destination node in the mesh network 100. For example, the router device 302 receives a packet addressed with an RLOC for the end device 304. The router device 302 determines that the packet cannot be forwarded using the RLOC, such as by looking-up the RLOC in an address mapping cache 306. Instead of dropping the packet, the router 302 initiates an address query within the mesh network 100, and the address query goes out to the other routers 102 in the mesh network. If the router device 302 receives an EID-to-RLOC mapping from another router 102, the router 302 readdresses the packet with the updated RLOC and forwards the packet to the destination node, such as the end device 304 in this example.

Additionally and/or optionally, the router device 302 updates the address mapping cache 306 with the received EID-to-RLOC mapping and/or sends an address notification message to notify a source node for the packet of the new EID-to-RLOC mapping. Notifying the source node of the new mapping reduces misaddressing future packets to the destination node. If the router device 302 receives additional packets that are addressed with the RLOC, the router device 302 uses the updated EID-to-RLOC mapping from the address mapping cache 306 to readdress the packets and forward the packets to the destination node.

In another aspect of automatic rerouting in Thread networks, the router device 302 may receive additional packets with the same invalid IPv6-to-RLOC address mapping, after the router device 302 has sent the address query, but has not yet received the updated address mapping. The router 302 can then buffer the additional packets and, if the updated EID-to-RLOC mapping is received from another router 102, the router device 302 readdresses the additional packets with the updated RLOC and forwards the additional packets to the destination node.

In another aspect of automatic rerouting in Thread networks, the end device 304 may have previously been a child of a parent router 308, as shown at 310. The end device 304 has changed parent devices and is now a child of the router 312, as shown at 314. The router 308 receives a packet addressed with an RLOC for the end device 304 and indicating that the router 308 is the parent of the end device 304. The router 308 then determines that the end device 304 is no longer its child. Instead of dropping the packet, the router 308 initiates an address query within the mesh network 100. The router 308 receives an EID-to-RLOC mapping from the router 312, which is now the parent of the end device 304. The router 308 may also receive an EID-to-RLOC mapping from another router 102, or from a router-eligible end device 104. The router 308 readdresses the packet with the updated RLOC and forwards the packet to the destination node.

Figure 4:
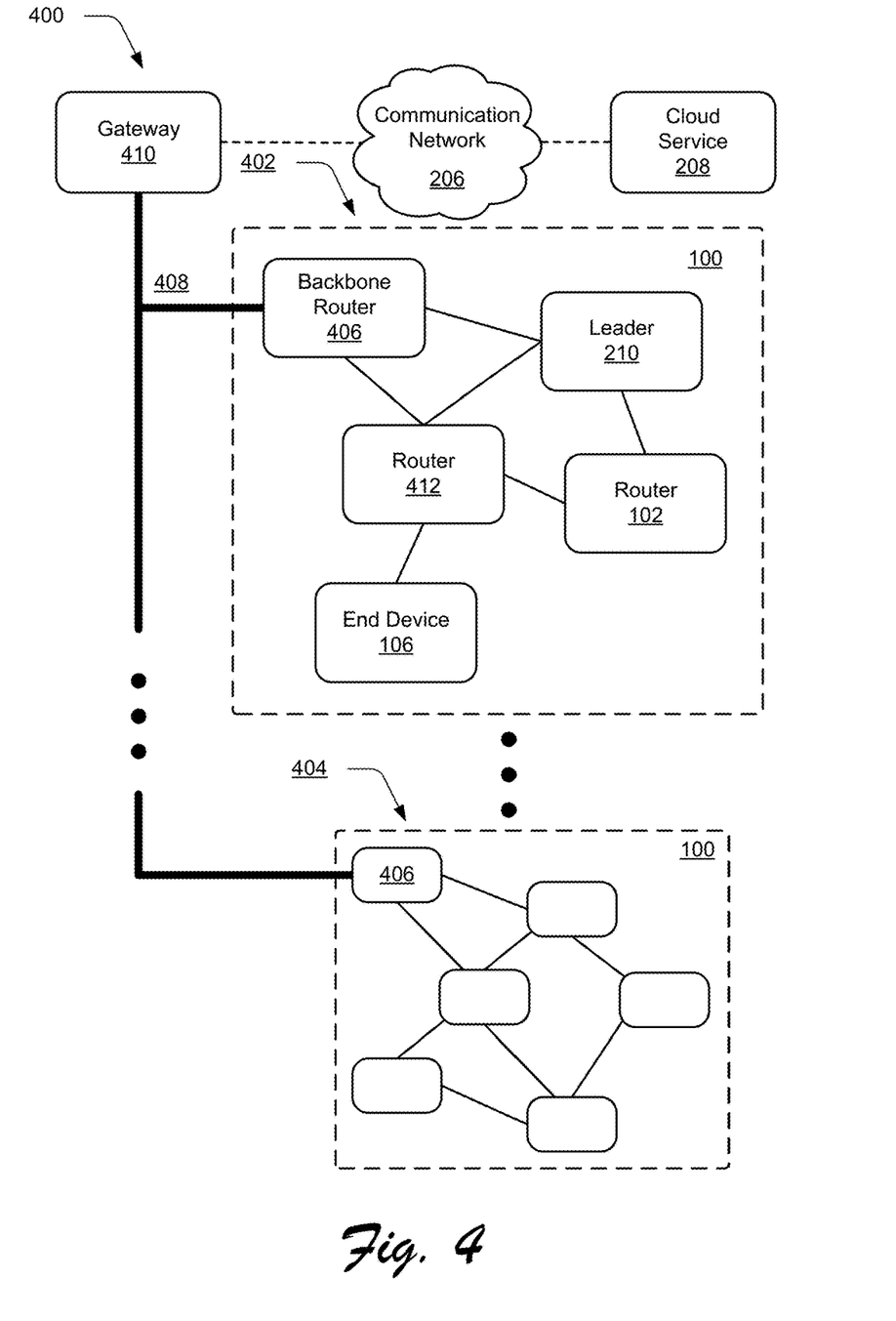
FIG. 4 further illustrates an example environment in which various aspects of automatic rerouting in Thread networks techniques can be implemented.

FIG. 4 illustrates an example environment 400 in which various aspects and techniques for automatic rerouting in Thread networks can be implemented. The environment 400 illustrates multiple mesh networks 100, such as shown at 402 and 404, connected by backbone routers 406 to a backbone network 408. For example, each of mesh networks 100 in the environment 400 may be deployed on a different floor or zone in a commercial building and the backbone network 408 may be any suitable network, such as Ethernet, Wi-Fi, and so forth. A gateway 410 is connected to the backbone network 408, which connects the mesh networks 100 to external networks and services.

In addition to RLOC-to-EID mappings becoming invalid due to the movements of mesh network devices within a single mesh network 100, as described with respect to the environment 300, mesh network devices may move between mesh networks 100 in the environment 400 based on varying connectivity conditions. For example, a mesh network device moves from the mesh network 402 to the mesh network 404.

As described with respect to environment 300, a router 302 first attempts to determine a new RLOC-to-EID mapping for rerouting a packet within the mesh network 100 to which the router 302 is connected. For example, a router device 412 in the mesh network 402 sends an address query within the mesh network 402. If that address query fails to return an updated RLOC-to-EID mapping, the router 412 can send a message to the backbone router 406 in the mesh network 402 requesting an address query across the mesh networks 100 connected via the backbone network 408.

Each backbone router 406 of the respective mesh networks 100 responds to the address query by returning an RLOC-to-EID mapping, if the backbone router has such a mapping, and/or propagates an address query within the respective mesh network 100 connected via the backbone router 406. For example, the backbone router in the mesh network 402 transmits an address query across the backbone network 408. The backbone router 406 in the mesh network 404 returns an EID-to-RLOC mapping, from an address query in the mesh network 404, to the router device 412 that the router device 412 uses for packet rerouting.

Example method 500 is described with reference to FIG. 5 in accordance with one or more aspects of automatic rerouting in Thread networks. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
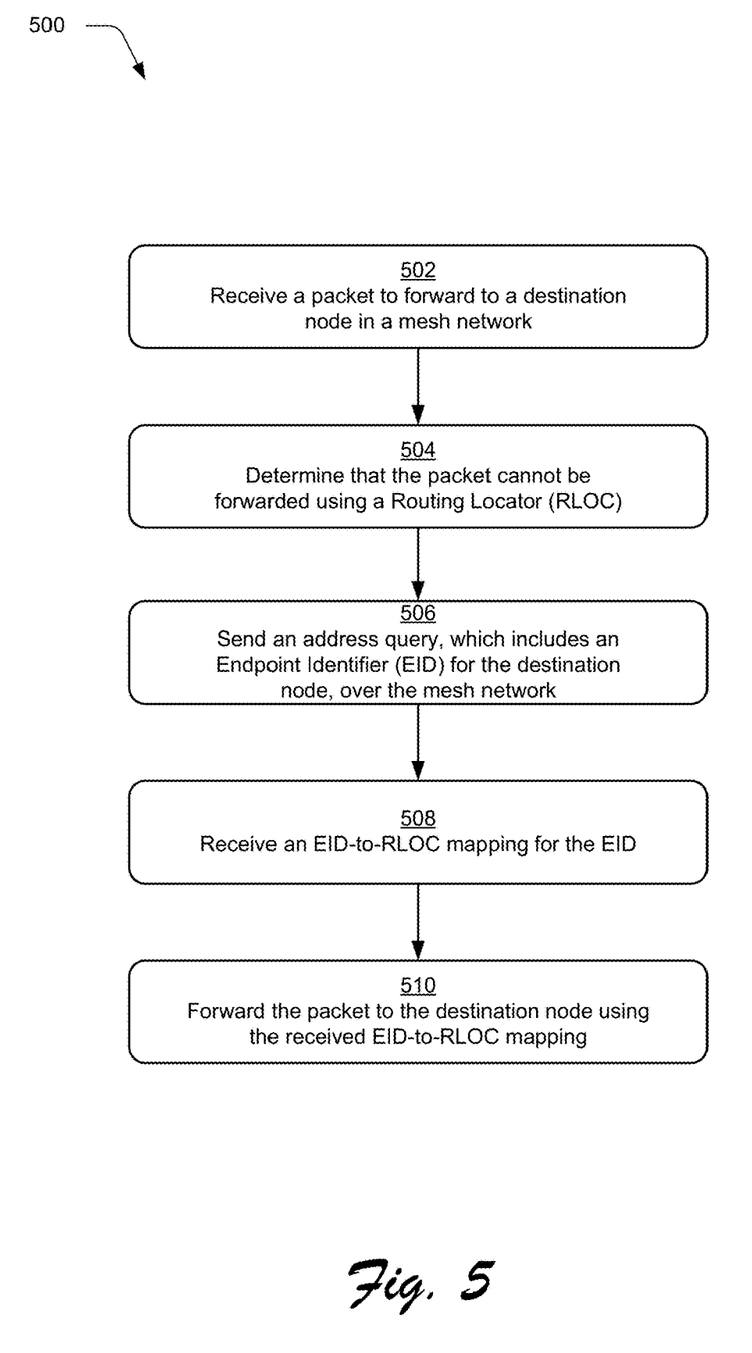
FIG. 5 illustrates an example method of automatic rerouting in Thread networks as generally related to addressing and routing packets in a mesh network in accordance with aspects of the techniques described herein.

FIG. 5 illustrates example method(s) 500 of automatic rerouting in Thread networks as generally related to addressing and routing packets in a mesh network. The order in which the method blocks are described are not intended to be construed as a limitation, and any number of the described method blocks can be combined in any order to implement a method, or an alternate method.

At block 502, a packet from a source node is received at a router device in a mesh network, the packet includes a routing locator (RLOC) for a destination node and, at block 504, the router device determines that the packet cannot be forwarded using the RLOC. For example, the router device 102 receives a packet that includes an RLOC for a destination node from a source node and determines that the packet cannot be forwarded using the RLOC either because the forwarding fails or because a cache of EID-to-RLOC mappings stored in the router device 102 does not include a next hop entry for forwarding the packet.

At block 506, the router device initiates an address query that includes and EID for the destination of the packet, and at block 508, the router device receives an EID-to-RLOC mapping for the EID from another router in the mesh network. For example, the router device 102 multicasts an address query message across the mesh network 100 that includes the EID for the destination node. In response to the address query, the router device 102 receives an EID-to-RLOC mapping for the EID from another router 102 or router-eligible end device 104.

At block 510, the router device forwards the packet using the received EID-to-RLOC mapping. For example, the router device 102 forwards the packet to the next hop in the mesh network 100 toward the destination node using the received an EID-to-RLOC mapping.

Figure 6:
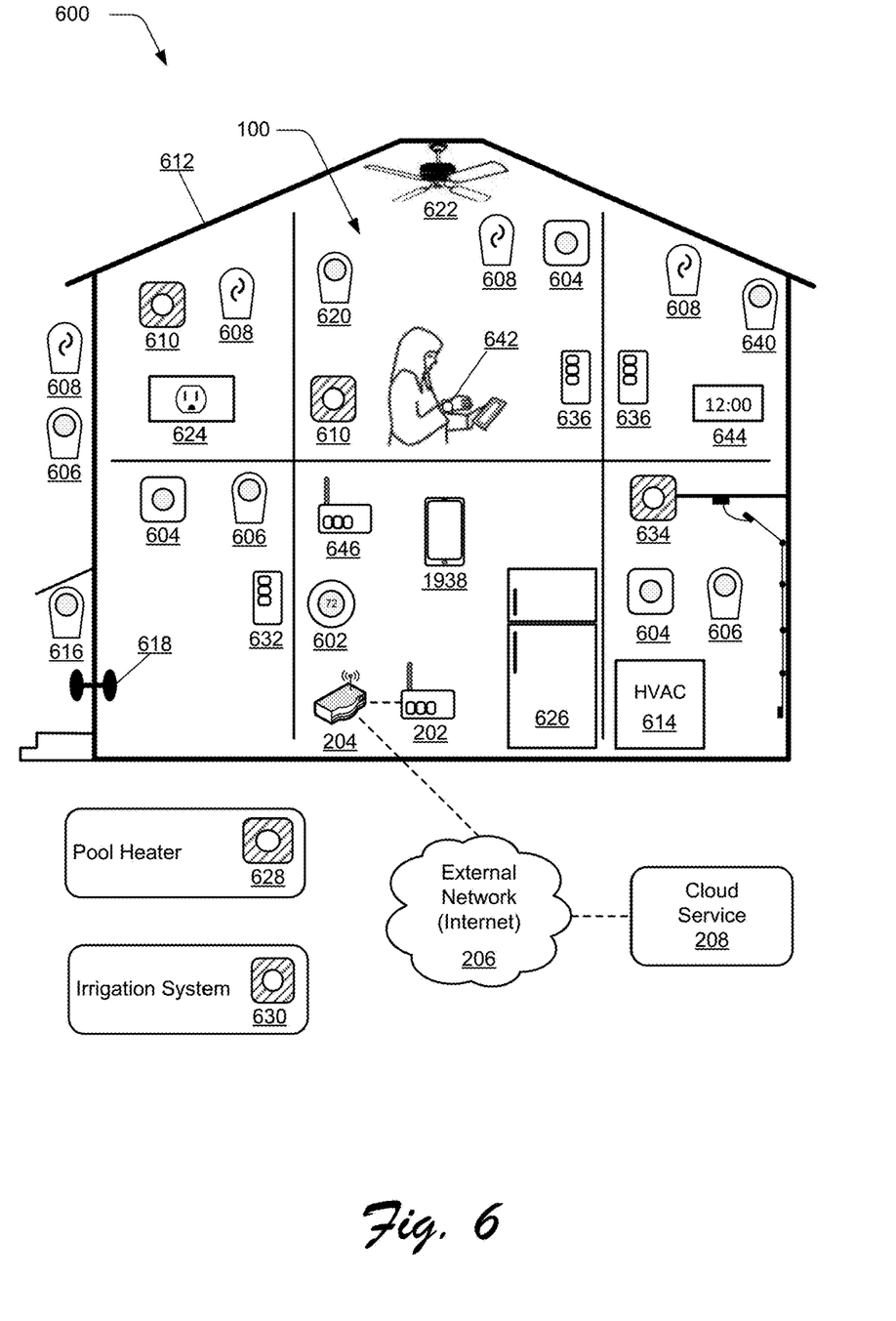
FIG. 6 illustrates an example environment in which a mesh network can be implemented in accordance with aspects of the techniques described herein.

FIG. 6 illustrates an example environment 600 in which the mesh network 100 (as described with reference to FIG. 1), and aspects of automatic rerouting in Thread networks can be implemented. Generally, the environment 600 includes the mesh network 100 implemented as part of a smart-home or other type of structure with any number of mesh network devices that are configured for communication in a mesh network. For example, the mesh network devices can include a thermostat 602, hazard detectors 604 (e.g., for smoke and/or carbon monoxide), cameras 606 (e.g., indoor and outdoor), lighting units 608 (e.g., indoor and outdoor), and any other types of mesh network devices 610 that are implemented inside and/or outside of a structure 612 (e.g., in a smart-home environment). In this example, the mesh network devices can also include any of the previously described devices, such as a border router 202, as well as any of the devices implemented as a router device 102, and/or as an end device 106.

In the environment 600, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 7.

In implementations, the thermostat 602 may include a Nest® Learning Thermostat that detects ambient climate characteristics (e.g., temperature and/or humidity) and controls a HVAC system 614 in the smart-home environment. The learning thermostat 602 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 604 can be implemented to detect the presence of a hazardous substance or a substance indicative of a hazardous substance (e.g., smoke, fire, or carbon monoxide). In examples of wireless interconnection, a hazard detector 604 may detect the presence of smoke, indicating a fire in the structure, in which case the hazard detector that first detects the smoke can broadcast a low-power wake-up signal to all of the connected mesh network devices. The other hazard detectors 604 can then receive the broadcast wake-up signal and initiate a high-power state for hazard detection and to receive wireless communications of alert messages. Further, the lighting units 608 can receive the broadcast wake-up signal and activate in the region of the detected hazard to illuminate and identify the problem area. In another example, the lighting units 608 may activate in one illumination color to indicate a problem area or region in the structure, such as for a detected fire or break-in, and activate in a different illumination color to indicate safe regions and/or escape routes out of the structure.

In various configurations, the mesh network devices 610 can include an entryway interface device 616 that functions in coordination with a network-connected door lock system 618, and that detects and responds to a person's approach to or departure from a location, such as an outer door of the structure 612. The entryway interface device 616 can interact with the other mesh network devices based on whether someone has approached or entered the smart-home environment. An entryway interface device 616 can control doorbell functionality, announce the approach or departure of a person via audio or visual means, and control settings on a security system, such as to activate or deactivate the security system when occupants come and go. The mesh network devices 610 can also include other sensors and detectors, such as to detect ambient lighting conditions, detect room-occupancy states (e.g., with an occupancy sensor 620), and control a power and/or dim state of one or more lights. In some instances, the sensors and/or detectors may also control a power state or speed of a fan, such as a ceiling fan 622. Further, the sensors and/or detectors may detect occupancy in a room or enclosure, and control the supply of power to electrical outlets or devices 624, such as if a room or the structure is unoccupied.

The mesh network devices 610 may also include connected appliances and/or controlled systems 626, such as refrigerators, stoves and ovens, washers, dryers, air conditioners, pool heaters 628, irrigation systems 630, security systems 632, and so forth, as well as other electronic and computing devices, such as televisions, entertainment systems, computers, intercom systems, garage-door openers 634, ceiling fans 622, control panels 636, and the like. When plugged in, an appliance, device, or system can announce itself to the mesh network as described above, and can be automatically integrated with the controls and devices of the mesh network, such as in the smart-home. It should be noted that the mesh network devices 610 may include devices physically located outside of the structure, but within wireless communication range, such as a device controlling a swimming pool heater 628 or an irrigation system 630.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices 638, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 602 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 640 detects that the room is dark and when the occupancy sensor 620 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 608 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 608 that lead to a safe exit. The light units 608 may also be turned-on to indicate the direction along an exit route that a person should travel to safely exit the structure.

The various mesh network devices may also be implemented to integrate and communicate with wearable computing devices 642, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 610 may also include a smart alarm clock 644 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 602 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 602 so as to pre-heat or cool the environment to a desired setting, and turning-on or turning-off the lights 608.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 600 may include one or more mesh network devices 102 that function as a hub 646. The hub 646 may be a general-purpose home automation hub, or an application-specific hub, such as a security hub, an energy management hub, an HVAC hub, and so forth. The functionality of a hub 646 may also be integrated into any mesh network device 102, such as a smart thermostat device or the border router 202. Hosting functionality on the hub 646 in the structure 612 can improve reliability when the user's internet connection is unreliable, can reduce latency of operations that would normally have to connect to the cloud service 208, and can satisfy system and regulatory constraints around local access between mesh network devices 102.

Figure 7:
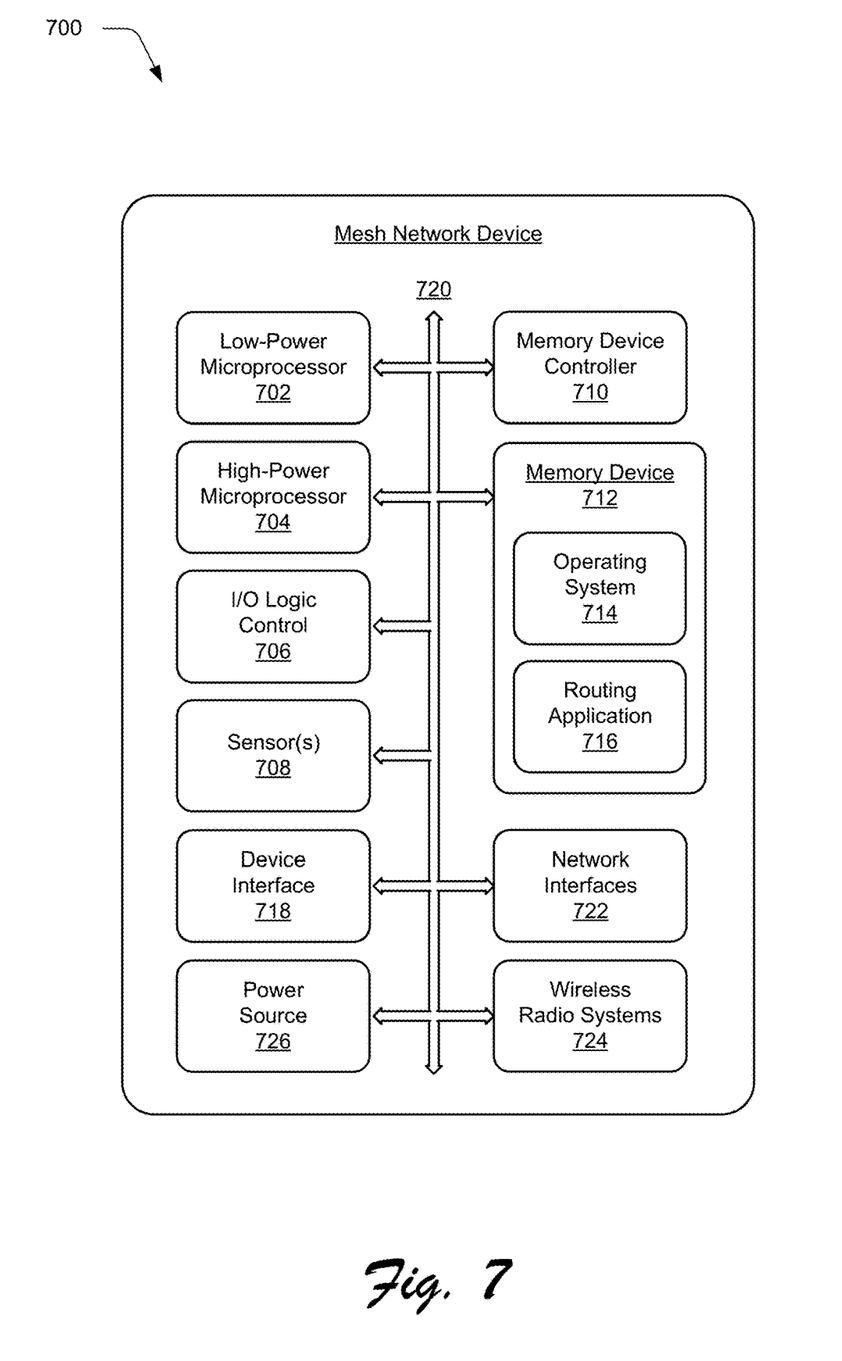
FIG. 7 illustrates an example mesh network device that can be implemented in a mesh network environment in accordance with one or more aspects of the techniques described herein.

FIG. 7 illustrates an example mesh network device 700 that can be implemented as any of the mesh network devices in a mesh network in accordance with one or more aspects of automatic rerouting in Thread networks as described herein. The device 700 can be integrated with electronic circuitry, microprocessors, memory, input output (I/O) logic control, communication interfaces and components, as well as other hardware, firmware, and/or software to implement the device in a mesh network. Further, the mesh network device 700 can be implemented with various components, such as with any number and combination of different components as further described with reference to the example device shown in FIG. 8.

In this example, the mesh network device 700 includes a low-power microprocessor 702 and a high-power microprocessor 704 (e.g., microcontrollers or digital signal processors) that process executable instructions. The device also includes an input-output (I/O) logic control 706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 702 and the high-power microprocessor 704 can also support one or more different device functionalities of the device. For example, the high-power microprocessor 704 may execute computationally intensive operations, whereas the low-power microprocessor 702 may manage less complex processes such as detecting a hazard or temperature from one or more sensors 708. The low-power processor 702 may also wake or initialize the high-power processor 704 for computationally intensive processes.

The one or more sensors 708 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 708 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 700 includes a memory device controller 710 and a memory device 712, such as any type of a nonvolatile memory and/or other suitable electronic data storage device. The mesh network device 700 can also include various firmware and/or software, such as an operating system 714 that is maintained as computer executable instructions by the memory and executed by a microprocessor. The device software may also include a routing application 716 that implements aspects of automatic rerouting in Thread networks. The mesh network device 700 also includes a device interface 718 to interface with another device or peripheral component, and includes an integrated data bus 720 that couples the various components of the mesh network device for data communication between the components. The data bus in the mesh network device may also be implemented as any one or a combination of different bus structures and/or bus architectures.

The device interface 718 may receive input from a user and/or provide information to the user (e.g., as a user interface), and a received input can be used to determine a setting. The device interface 718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 718 may also receive inputs from any number of peripherals, such as buttons, a keypad, a switch, a microphone, and an imager (e.g., a camera device).

The mesh network device 700 can include network interfaces 722, such as a mesh network interface for communication with other mesh network devices in a mesh network, and an external network interface for network communication, such as via the Internet. The mesh network device 700 also includes wireless radio systems 724 for wireless communication with other mesh network devices via the mesh network interface and for multiple, different wireless communications systems. The wireless radio systems 724 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The mesh network device 700 also includes a power source 726, such as a battery and/or to connect the device to line voltage. An AC power source may also be used to charge the battery of the device.

Figure 8:
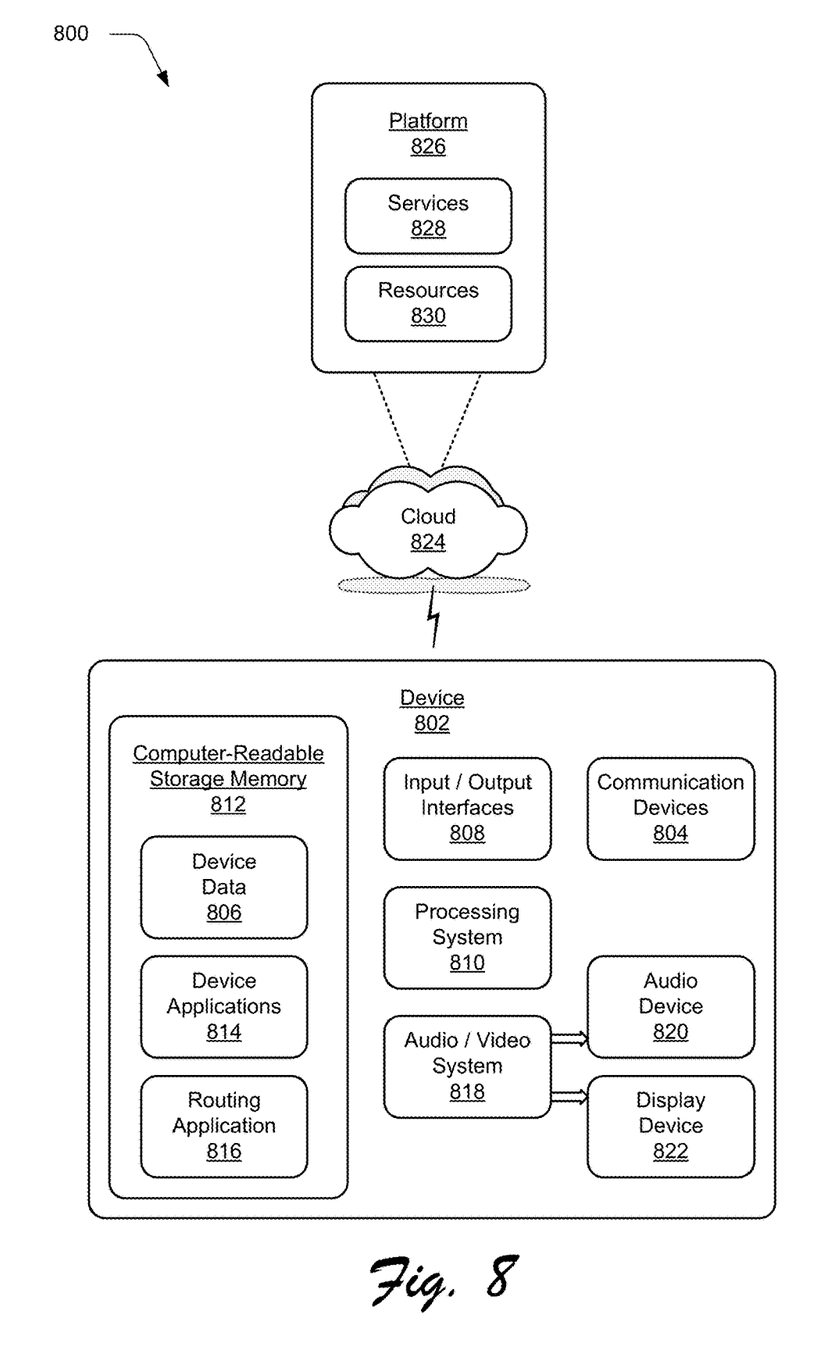
FIG. 8 illustrates an example system with an example device that can implement aspects of automatic rerouting in Thread networks.

FIG. 8 illustrates an example system 800 that includes an example device 802, which can be implemented as any of the mesh network devices that implement aspects of automatic rerouting in Thread networks as described with reference to the previous FIGS. 1-7. The example device 802 may be any type of computing device, client device, mobile phone, tablet, communication, entertainment, gaming, media playback, and/or other type of device. Further, the example device 802 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 802 includes communication devices 804 that enable wired and/or wireless communication of device data 806, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 804 can also include transceivers for cellular phone communication and/or for network data communication.

The device 802 also includes input/output (I/O) interfaces 808, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage memory 812, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. The device applications may also include a device manager, such as any form of a control application, software application, signal processing and control module, code that is native to a particular device, a hardware abstraction layer for a particular device, and so on. In this example, the device applications also include a routing application 816 that implements aspects of automatic rerouting in Thread networks, such as when the example device 802 is implemented as any of the mesh network devices described herein.

The device 802 also includes an audio and/or video system 818 that generates audio data for an audio device 820 and/or generates display data for a display device 822. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device. In aspects, at least part of the techniques described for automatic rerouting in Thread networks may be implemented in a distributed system, such as over a "cloud" 824 in a platform 826. The cloud 824 includes and/or is representative of the platform 826 for services 828 and/or resources 830.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device aspect with functionality distributed throughout the system 800. For example, the functionality may be implemented in part at the example device 802 as well as via the platform 826 that abstracts the functionality of the cloud 824.

Although aspects of automatic rerouting in Thread networks have been described in language specific to features and/or methods, the subject of the appended claims is not necessarily limited to the specific features or methods described. Rather, the specific features and methods are disclosed as example implementations of automatic rerouting in Thread networks, and other equivalent features and methods are intended to be within the scope of the appended claims. Further, various different aspects are described and it is to be appreciated that each described aspect can be implemented independently or in connection with one or more other described aspects.

The invention claimed is:

1. A method of rerouting a packet in a mesh network, the method comprising:
   receiving, at a router device in the mesh network, the packet to forward to a destination node in the mesh network, the packet comprising a Routing Locator (RLOC) for the destination node;
   determining that the packet cannot be forwarded using the RLOC;
   sending an address query over the mesh network, the address query including an Endpoint Identifier (EID) of the destination node;
   receiving an EID-to-RLOC mapping for the EID from a node device in the mesh network; and
   forwarding the packet to the destination node using the received EID-to-RLOC mapping.

2. The method of claim 1, the method further comprising:
   sending an address notification message, which includes the received EID-to-RLOC mapping, to a source node that transmitted the packet.

3. The method of claim 2, wherein the source node is a cloud service.

4. The method of claim 1, further comprising:
   storing the received EID-to-RLOC mapping in a cache of EID-to-RLOC mappings.

5. The method of claim 4, wherein said determining that the packet cannot be forwarded using the RLOC comprises:
   determining that the cache of EID-to-RLOC mappings does not include a next hop entry for forwarding the packet; or
   detecting that forwarding the packet using the RLOC fails.

6. The method of claim 1, wherein the packet comprises an indication of a level of priority of the packet, the method further comprising:

based on said determining that the packet cannot be forwarded using the RLOC, comparing the level of priority to a threshold; and if the level of priority is below the threshold, dropping the packet instead of said sending the address query.

7. The method of claim 1, further comprising:
before said receiving the EID-to-RLOC mapping for the EID, receiving an additional packet to forward to the destination node;
buffering the additional packet until after said receiving the EID-to-RLOC mapping for the EID; and
forwarding the additional packet to the destination node using the received EID-to-RLOC mapping.

8. The method of claim 1, wherein the RLOC indicates that the destination node is a child device of the router device, and wherein the packet cannot be forwarded because the destination node is no longer the child device of the router device.

9. A mesh network device implemented as a router device, the mesh network device comprising:
a mesh network interface configured for communication in a mesh network;
a memory and processor system to implement an application that is configured to:
  receive, via the mesh network interface, a packet to forward to a destination node in the mesh network, the packet comprising a Routing Locator (RLOC) for the destination node;
  determine that the packet cannot be forwarded using the RLOC;
  send an address query over the mesh network, the address query including an Endpoint Identifier (EID) of the destination node;
  receive an EID-to-RLOC mapping for the EID from a node device in the mesh network; and
  forward the packet to the destination node using the received EID-to-RLOC mapping.

10. The mesh network device of claim 9, wherein the application is configured to send an address notification message, which includes the received EID-to-RLOC mapping, to a source node that transmitted the packet.

11. The mesh network device of claim 10, wherein the source node is a cloud service.

12. The mesh network device of claim 9, wherein the application is configured to store the received EID-to-RLOC mapping in a cache of EID-to-RLOC mappings in the memory.

13. The mesh network device of claim 9, wherein the packet comprises an indication of a level of priority of the packet, and wherein the application is configured to:
based on the determination that the packet cannot be forwarded using the RLOC, compare the level of priority to a threshold; and
if the level of priority is below the threshold, drop the packet.

14. The mesh network device of claim 9, wherein the application is configured to:
before the reception of the EID-to-RLOC mapping for the EID, receive an additional packet to forward to the destination node;
buffer the additional packet in the memory of the mesh network device until after the reception of the EID-to-RLOC mapping for the EID; and
forward the additional packet to the destination node using the received EID-to-RLOC mapping.

15. The mesh network device of claim 9, wherein the RLOC indicates that the destination node is a child device of the mesh network device, and wherein the packet cannot be forwarded because the destination node is no longer the child device of the mesh network device.

16. A system comprising:
a mesh network; and
a router device in the mesh network, the router device configured to:
  receive, via the mesh network, a packet to forward to a destination node in the mesh network, the packet comprising a Routing Locator (RLOC) for the destination node;
  determine that the packet cannot be forwarded using the RLOC;
  send an address query over the mesh network, the address query including an Endpoint Identifier (EID) of the destination node;
  receive an EID-to-RLOC mapping for the EID from a node device in the mesh network; and
  forward the packet to the destination node using the received EID-to-RLOC mapping.

17. The system of claim 16, wherein a cloud-based service is the source of the packet, and the router device is configured to send an address notification message to the cloud-based service that includes the received EID-to-RLOC mapping.

18. The system of claim 16, wherein the packet comprises an indication of a level of priority of the packet, and wherein the router device is configured to:
based on the determination that the packet cannot be forwarded using the RLOC, compare the level of priority to a threshold; and
if the level of priority is below the threshold, drop the packet.

19. The system of claim 16, wherein the router device is configured to:
before the reception of the EID-to-RLOC mapping for the EID, receive an additional packet to forward to the destination node;
buffer the additional packet in a memory of the router device until after the reception of the EID-to-RLOC mapping for the EID; and
forward the additional packet to the destination node using the received EID-to-RLOC mapping.

20. The system of claim 16, wherein the RLOC indicates that the destination node is a child device of the router device, and wherein the packet cannot be forwarded because the destination node is no longer the child device of the router device.

* * * * *